United States Patent [19]

Beers et al.

[11] Patent Number: 5,491,196
[45] Date of Patent: Feb. 13, 1996

[54] HALOBUTYL/SOLUTION POLYMERIZED SBR INNERLINER

[75] Inventors: Roger N. Beers, Uniontown; David A. Benko, Munroe Falls; Bill B. Gross, Stow; Adel F. Halasa, Bath, all of Ohio

[73] Assignee: The Goodyear Tire & Rubber Company, Akron, Ohio

[21] Appl. No.: 393,788

[22] Filed: Feb. 24, 1995

[51] Int. Cl.$^6$ .............................. C08L 9/06; C08L 15/02; B60C 1/00
[52] U.S. Cl. ............................................ 525/237; 152/510
[58] Field of Search ............................. 525/237; 152/510

[56] References Cited

U.S. PATENT DOCUMENTS

| | | | |
|---|---|---|---|
| 2,809,372 | 10/1957 | Frederick et al. | 525/237 |
| 2,906,313 | 9/1959 | Ford | 525/237 |
| 2,926,718 | 3/1960 | Baldwin et al. | 525/237 |
| 3,985,832 | 10/1976 | Newman | 260/888 |
| 4,279,284 | 7/1981 | Spadone | 152/330 |
| 4,714,732 | 12/1987 | Hoshino | 524/474 |
| 4,725,649 | 2/1988 | Hoshino | 525/133 |
| 5,005,625 | 4/1991 | Klemmensen et al. | 152/510 |
| 5,088,537 | 2/1992 | Kan et al. | 525/237 |
| 5,093,423 | 3/1992 | Bayan et al. | 525/99 |
| 5,153,262 | 10/1992 | Beers | 525/57 |
| 5,262,213 | 11/1993 | Rodgers et al. | 428/36.8 |
| 5,333,662 | 8/1994 | Costemalle et al. | 152/510 |
| 5,434,212 | 7/1995 | Yatsunami et al. | 525/237 |

FOREIGN PATENT DOCUMENTS

| | | |
|---|---|---|
| 57-172945 | 10/1982 | Japan . |
| 57-195760 | 12/1982 | Japan . |
| 59-168046 | 9/1984 | Japan . |

*Primary Examiner*—Carman J. Seccuro, Jr.
*Attorney, Agent, or Firm*—Bruce J. Hendricks

[57] ABSTRACT

The present invention relates to a tire innerliner and pneumatic tires containing the same, which are prepared from a composition comprising, based on 100 parts by weight of rubber, a blend containing 30 to about 50 parts by weight of a solution polymerized styrene-butadiene rubber having a Tg ranging from −45° C. to −65° C. and 70 to 50 parts by weight of a halobutyl rubber.

12 Claims, No Drawings

HALOBUTYL/SOLUTION POLYMERIZED SBR INNERLINER

BACKGROUND OF THE INVENTION

The inner surface of a pneumatic tire is typically comprised of an elastomeric composition designed to prevent or retard the permeation of air from the tire's inner air chamber. It is often referred to as an innerliner. Rubbers, such as butyl and halobutyl rubber, which are relatively impermeable to air are often used as the major rubber component in the innerliners.

The innerliner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

Halobutyl rubber is generally one of the most expensive rubbers used in a tire. Given the competitive tire market and the continued need to lower the cost of manufacturing tires without sacrificing properties, there exists a need to eliminate or substantially decrease the cost of innerliners which perform such an important function in the performance of a tire.

Emulsion and solution polymerized styrene butadiene rubbers are commonly used in the tread portion of a tire. Since such styrene butadiene copolymers are typically more economical than halobutyl rubbers, one would hope that such styrene butadiene copolymers could be utilized in other components such as an innerliner. Unfortunately, typical styrene butadiene copolymers suffer from unacceptable air permeabilities. Since a rubber used in an innerliner must have acceptable air permeability, the use of a significant amount of styrene butadiene copolymer in an innerliner would be expected to meet with failure.

As can be appreciated by one skilled in the art, another critical property that an innerliner must exhibit is cold flexural properties. Simply stated, since an innerliner will be subject to low temperatures in use and that such temperatures along with the normal deformation of the innerliner lead to cracks, the elastomeric composition must exhibit cold flexural properties to avoid cracks and therefore air leaks.

Summary of the Invention

The present invention relates to a tire innerliner and pneumatic tires containing the same, which are prepared from a composition comprising, based on 100 parts by weight of rubber, a blend containing (a) about 30 to about 50 parts by weight of a solution polymerized styrene-butadiene rubber having a Tg ranging from −45° C. to −65° C. and (b) about 70 to 50 parts by weight of a halobutyl rubber.

Detailed Description of the Invention

There is disclosed a tire innerliner prepared from a composition comprising, based on 100 parts by weight of rubber, a blend of (A) about 30 to about 50 parts by weight of a solution polymerized polymer having repeating units and a Tg ranging from −45° C. to −65° C., wherein (1) 25 to 40 weight percent of the repeating units are derived from styrene;

(2) 5 to 30 weight percent of the repeating units have a 1,2-microstructure and are derived from butadiene; and (3) 40 to 60 weight percent of the repeating units have a 1,4-microstructure and are derived from butadiene; and (B) about 70 to about 50 parts by weight of a halobutyl rubber.

In addition, there is disclosed a pneumatic tire having an innerliner prepared from a composition comprising, based on 100 parts by weight of rubber, a blend of (A) about 30 to about 50 parts by weight of a solution polymerized polymer having repeating units and a Tg ranging from −45° C. to −65° C., wherein (1) 25 to 40 weight percent of the repeating units are derived from styrene;

(2) 5 to 30 weight percent of the repeating units have a 1,2-microstructure and are derived from butadiene; and (3) 40 to 60 weight percent of the repeating units have a 1,4-microstructure and are derived from butadiene; and (B) about 70 to about 50 parts by weight of a halobutyl rubber.

The blend of rubber for use as a tire innerliner contains from about 30 to about 50 parts by weight of a solution polymerized polymer having repeating units and a Tg ranging from −45° C. to −65° C. Preferably, the solution polymerized polymer has a Tg ranging from −50° to −60° C. In amounts less than 30 parts, the economic incentives of the present invention are diminished. In amounts greater than 50 parts, undesirable properties result in terms of unacceptable oxygen permeabilities and inferior cold flex properties. Preferably, this component is present in an amount ranging from 40 to 50 parts by weight of the overall blend. The most preferred level of bromobutyl rubber ranges from 40 to about 45 parts by weight. The solution polymerized polymer is further characterized by (a) 25 to 40 weight percent of the repeating units are derived from styrene; (b) 5 to 30 weight percent of the repeating units have a 1,2-microstructure and are derived from butadiene; and (c) 40 to 60 weight percent of the repeating units have a 1,4-microstructure and are derived from butadiene. In a preferred embodiment, the solution polymerized polymer is characterized by (a) 27 to 37 weight percent of the repeating units are derived from styrene; (b) 10 to 27 weight percent of the repeating units have a 1,2-microstructure; and (3) 44 to 55 weight percent of the repeating units have a 1,4-microstructure. These solution polymerized polymers are characterized by a random distribution.

In particular, there are two especially preferred solution polymerized SBR polymers. The first is commercially available from Firestone Synthetic Rubber & Latex Company under the tradename Duradene®709. This SBR has a Tg of −56° C., 35 weight percent of the repeating units are derived from styrene; 11 weight percent of the repeating units have a 1,2-microstructure derived from butadiene; and 54 weight percent of the repeating units have a 1,4-microstructure and are derived from butadiene. The other especially preferred solution polymerized SBR polymer has a Tg of −51° C., 29 weight percent of the repeating units are derived from styrene; 26 weight percent of the repeating units have a 1,2-microstructure derived from butadiene; and 45 weight percent of the repeating units have a 1,4-microstructure and are derived from butadiene. This second especially preferred SBR may be prepared in accordance with the teachings of U.S. Pat. Nos. 5,336,739, 4,104,465 and 4,139,490, incorporated by reference in their entirety.

The halobutyl component of the blend used in the innerliner is selected from the group consisting of chlorobutyl rubber, bromobutyl rubber and mixtures thereof. This component is present in an amount ranging from about 70 to about 50 parts by weight, based on 100 parts by weight of rubber in the overall blend. Preferably, this component is present in an amount ranging from about 60 to 50 parts by weight of the overall blend. The most preferred level of bromobutyl rubber ranges from 60 to about 55 parts by weight.

The term "chlorobutyl rubber" used herein generally means those rubbers obtained by chlorinating copolymers which are prepared from a polymerization mixture comprising isoolefins (e.g., isobutylene) and conjugated multiolefins (e.g., isoprene). The unmodified (nonchlorinated) copolymers are generally known as "butyl rubber."

Chlorinated butyl rubber may be prepared by contacting butyl rubber in a solution of 1 to 60 weight percent of butyl rubber in a substantially inert $C_5$–$C_8$ hydrocarbon solvent (e.g., pentane, hexane, heptane, etc) with chlorine gas for about two seconds to about 25 minutes (see U.S. Pat. No. 3,099,644). The resultant chlorinated butyl rubber contains at least 0.5 weight percent based on copolymer and up to one chlorine atom per double bond initially present in the copolymer (see also U.S. Pat. No. 2,944,578).

The term "bromobutyl rubber" used herein means brominated butyl rubber. Bromination may be carried out by contacting butyl rubber with bromine or appropriate bromine-containing compounds. The resultant brominated butyl rubber contains about 0.5 to 3 bromine atoms per molecule of multiolefin. Typical brominating agents are molecular bromine, sodium hypobromite, sulfur bromide, N-bromosuccinimide, hydrogen bromide, etc. The bromination is advantageously conducted at temperatures of about $-50°$ C. to about $+150°$ C., preferably about $20°$ C. to $60°$ C. for about one minute to several hours. The temperatures and time may be regulated so as to obtain the above bromine content.

The bromination may be carried out according to various methods. One method comprises preparing a solution of butyl rubber in a suitable unreactive organic solvent such as heptane, kerosene, toluene, chlorobenzene, trichloroethane, etc, and adding thereto gaseous or liquid bromine or a bromine compound. Another method comprises blending solid butyl rubber with a solid brominating agent such as N-bromosuccinimide which leads to allylic substitution. In such a case, the blend formed is preferably mill-mixed and advantageously heated to a temperature sufficient to brominate the solid butyl rubber. The milling pressure may be set higher or lower than atmospheric pressure, depending on the heating temperatures.

There are a number of commercial grades of halobutyl rubber which may be used in the present invention. For example, Exxon Corporation markets a bromobutyl rubber under the designation Exxon Bromobutyl 2222 which has a Mooney viscosity at $125°$ C. of 27–37 and 2 percent by weight percent of halogen. In addition, Polysar Ltd markets a bromobutyl rubber under the designations Polysar Bromobutyl 2030 and 2030G which have a Mooney viscosity at $125°$ C. of 26–36 and 2.1 percent by weight halogen.

In those instances where the producer of the innerliner desires to further lower the cost of production, one may substitute minor amounts of the halobutyl rubber with butyl rubber. Commercially available butyl rubber comprises a major proportion of isobutylene units and a minor proportion of isoprene units. Conventional high molecular weight butyl rubber generally has a number average molecular weight of about 25,000 to about 500,000, preferably about 80,000 to about 300,000, more preferably about 100,000 to about 250,000, and has a Wijs iodine number of about 0.5 to 50, preferably 1 to 20. Low molecular weight butyl rubber has a number average molecular weight of 5,000 to 25,000, and mole percent unsaturation of 2 to 10.

The butyl rubber may be substituted in amounts up to 10 parts by weight, based on 100 parts by weight of the overall blend. Therefore, from 0 to a total of 10 parts by weight of the chlorobutyl or bromobutyl rubber may be substituted with butyl rubber. In no instances should the level of chlorobutyl or bromobutyl rubber be below 50 parts by weight of the total rubber in the blend used to form the tire innerliner.

The blend of solution SBR and halobutyl rubber may be compounded with conventional rubber compounding ingredients known for use in innerliners. Conventional ingredients commonly used in rubber vulcanizates are, for example, carbon black, hydrocarbon resins, phenol-formaldehyde resins, zinc oxide, processing aids, antioxidants, antiozonants, stearic acid, activators, waxes, oils and peptizing agents. As known to those skilled in the art, the above ingredients are commonly used in conventional amounts. Typical additions of carbon black comprise from 10 to 100 parts by weight of rubber (phr), preferably 50 to 75 phr. Conventional carbon blacks having the ASTM Designations N330, N660, N774, N907, N908, N990 and N991 may be used. Typical amounts of tackifier or hydrocarbon resins comprise 2 to 10 phr. Typical amounts of processing aids comprise 1 to 5 phr. Typical amounts of antioxidant comprise 1 to 10 phr. Typical amounts of antiozonants comprise 1 to 10 phr. Typical amounts of stearic acid comprise 0.50 to 2 phr. Typical amounts of zinc oxide comprise 1 to 5 phr. Typical amounts of waxes comprise 1 to 5 phr. Typical amounts of oils comprise 2 to 30 phr. Typical amounts of phenol-formaldehyde resin comprise from 1 to 10 phr. Typical amounts of peptizers comprise 0.1 to 1 phr. The presence and relative amounts of the above additives are not an aspect of the present invention.

The vulcanization of the composition for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in amount ranging from 0.2 to 8.0 phr with a range of from 0.5 to 5.0 being preferred.

Accelerators are used to control the time and/or temperature required for vulcanization and to improve the properties of the vulcanizate. A single accelerator system may be used, i.e., primary accelerator in conventional amounts ranging from 0.3 to 5.0 phr. In the alternative, combinations of two or more accelerators may be used which may consist of a primary accelerator which is generally used in the larger amount (0.3 to 5.0 phr), and a secondary accelerator which is generally used in smaller amounts (0.05–1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide. If a secondary accelerator is used, the secondary accelerator is preferably a guanidine, disulfide, dithiocarbamate or thiuram compound.

In practice, the above rubber compositions are used to form a layer or sheet. As known to those skilled in the art, the layer is produced by a press or passing a rubber composition through a mill, calender, multihead extruder or other suitable means. Preferably, the layer is produced by a calender because greater uniformity is believed to be provided. The uncured layer sheet is then constructed as an inner surface (exposed inside surface) of an uncured rubber tire structure, also known as the carcass. The innerliner is then sulfur-cocured with the tire carcass during the tire curing operation under conditions of heat and pressure. Vulcanization of the tire containing the innerliner of the present invention is generally carried out at temperatures of between 100° C. and 200° C. Preferably, the vulcanization is conducted at temperatures ranging from 110° C. to 180° C. Any of the usual vulcanization processes may be used, such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being cocured therewith as compared to being a simple adherent laminate. Typically, the innerliner of the present invention has an uncured gum thickness in the range of from 0.04–0.4 centimeters. Preferably, the innerliner has an uncured gum thickness in the range of from 0.08 to 0.02 centimeters. As a cured innerliner, the innerliner may have a thickness ranging from 0.02 to 0.35 centimeters. Preferably, as a cured innerliner, the thickness will range from 0.04 to 0.15 cm thickness.

The pneumatic tire with the integral innerliner may be constructed in the form of a passenger tire, truck tire or other type of bias or radial pneumatic tire.

The following examples are presented in order to illustrate but not limit the present invention.

EXAMPLE 1

Thirty-five samples were prepared to compare and contrast various aspects of the present invention. The 33 samples were tested for their oxygen permeability and cold flex properties.

The oxygen permeabilities were measured on a MoCon Oxytran 10/50 coulemetric instrument following ASTM D-3985-1.

The cold flex test method is conducted using a Monsanto flexometer or similar servohydraulic test equipment. Each sample size is 7.62 cm long, 2.54 cm wide and 12.7 mm thick. The test is conducted at –40° C. at a strain level of 12.5 percent and a frequency of 5 Hz. The test is conducted for a total of 6,000 cycles and the sample is rated as pass or fail. Failure constitutes any cracking, tearing or complete separation prior to completion of the 6,000 cycles. Pass means no damage occurred to the sample during the test.

As can be seen below in Table I, various styrene butadiene rubbers were used alone and in combination with bromobutyl rubber. The respective oxygen permeabilities and cold flex failure/pass rate is listed. Table I also lists the respective type of SBR, Tg, weight percent of repeating units for styrene, 1-2-microstructure and 1,4-microstructure and parts by weight per hundred total parts by weight of the SBR and bromobutyl rubber.

The bromobutyl rubber used in Example 1 was commercially EXXON Bromobutyl 2222 or Polysar Bromobutyl 2030.

In addition to the SBR and bromobutyl rubber, if any, each sample contained the same level of conventional amounts of carbon black, processing oil, stearic acid, hydrocarbon resin, phenol-formaldehyde resin, zinc oxide, accelerators and sulfur.

The test samples were cured at 150° C. by compression molding in a heated press for 36 minutes.

| Sample No. | Type of SBR | Tg | Styrene % | 1,2-PBD % | 1,4-PBD % | SBR (phr) | Bromo-Butyl Rubber (phr) | Oxygen Permeability* | Cold Flex (Pass or Fail) |
|---|---|---|---|---|---|---|---|---|---|
| 1 | Emulsion | –20 | 50 | 11.5 | 38.5 | 100 | 0 | 531 | Fail |
| 2 | Emulsion | –20 | 50 | 11.5 | 38.5 | 40 | 60 | 426 | Fail |
| 3 | Emulsion | –20 | 50 | 11.5 | 38.5 | 30 | 70 | 351 | Fail |
| 4 | Solution | –20 | 30 | 43 | 27 | 100 | 0 | 1317 | |
| 5 | Solution | –20 | 30 | 43 | 27 | 40 | 60 | 438 | Fail |
| 6 | Solution | –20 | 30 | 43 | 27 | 30 | 70 | 389 | Fail |
| 7 | Solution | –24 | 30 | 43 | 27 | 100 | 0 | 1527 | |
| 8 | Solution | –24 | 30 | 43 | 27 | 40 | 60 | 518 | Fail |
| 9 | Solution | –24 | 30 | 43 | 27 | 30 | 70 | 433 | Pass |
| 10 | Solution | –32 | 20 | 50 | 30 | 100 | 0 | 1197 | |
| 11 | Solution | –32 | 20 | 50 | 30 | 40 | 60 | | Fail |
| 12 | Solution | –32 | 20 | 50 | 30 | 30 | 70 | 401 | |
| 13 | Solution | –34 | 11 | 59 | 30 | 100 | 0 | 1693 | |
| 14 | Solution | –34 | 11 | 59 | 30 | 40 | 60 | | Fail |
| 15 | Solution | –34 | 11 | 59 | 30 | 30 | 70 | 442 | |
| 16 | Solution | –36 | 27 | 36 | 37 | 100 | 0 | 1730 | |
| 17 | Solution | –36 | 27 | 36 | 37 | 40 | 60 | 500 | Fail |
| 18 | Solution | –36 | 27 | 36 | 37 | 30 | 70 | 403 | Pass |
| 19 | Emulsion | –50 | 29 | 20 | 52 | 100 | 0 | 1819 | |
| 20 | Emulsion | –50 | 29 | 20 | 52 | 40 | 60 | 790 | Fail |
| 21 | Emulsion | –50 | 28 | 20 | 52 | 30 | 70 | | |
| 22 | Solution | –51 | 29 | 26 | 45 | 100 | 0 | 2152 | |
| 23 | Solution | –51 | 29 | 26 | 45 | 45 | 55 | 543 | Pass |

| Sample No. | Type of SBR | Tg | Styrene % | 1,2-PBD % | 1,4-PBD % | SBR (phr) | Bromo-Butyl Rubber (phr) | Oxygen Permeability* | Cold Flex (Pass or Fail) |
|---|---|---|---|---|---|---|---|---|---|
| 24 | Solution | −51 | 29 | 26 | 45 | 40 | 60 | 465 | Pass |
| 25 | Solution | −51 | 29 | 26 | 45 | 30 | 70 | 413 | Pass |
| 26 | Solution | −56 | 35 | 11 | 54 | 100 | 0 | 1854 | |
| 27 | Solution | −56 | 35 | 11 | 54 | 45 | 55 | 687 | Pass |
| 28 | Solution | −56 | 35 | 11 | 54 | 40 | 60 | 648 | Pass |
| 29 | Solution | −56 | 35 | 11 | 54 | 30 | 70 | 621 | Pass |
| 30 | Emulsion | −57 | 23.5 | 17.6 | 51.9 | 100 | 0 | 2115 | |
| 31 | Emulsion | −57 | 23.5 | 17.6 | 51.9 | 40 | 60 | 874 | Pass |
| 32 | Emulsion | −57 | 23.5 | 17.6 | 51.9 | 30 | 70 | 519 | Pass |
| 33 | Solution | −90 −25 | 30 | 23 | 47 | 100 | 0 | 1902 | |
| 34 | Solution | −90 −25 | 30 | 23 | 47 | 40 | 60 | 666 | Fail |
| 35 | Solution | −90 −25 | 30 | 23 | 47 | 30 | 70 | 407 | Pass |

$$* \frac{(cc\text{-mil})}{(100 in^2/day \cdot atm)}$$

The above table shows the relationship between oxygen permeability and low temperature flexibility for 11 SBR polymers and their blends at various ratios with bromobutyl rubber. Several things can be learned from this Table. At levels below 30 phr of SBR, the dominance of the holobutyl rubber clearly overshadows the contribution of the SBR. However, at levels of 30 phr to 50 phr, the Tg and the styrene level become critical in the blends in order to achieve desired permeabilities and low temperatures flex properties.

What is claimed is:

1. A tire innerliner prepared from a composition comprising, based on 100 parts by weight of rubber, a blend of
   (A) about 30 to about 50 parts by weight of a solution polymerized polymer having repeating units and a Tg ranging from −45° C. to −65° C., wherein
      (1) 25 to 40 weight percent of the repeating units are derived from styrene;
      (2) 5 to 30 weight percent of the repeating units have a 1,2-microstructure and are derived from butadiene; and
      (3) 40 to 60 weight percent of the repeating units have a 1,4-microstructure and are derived from butadiene; and
   (B) about 70 to about 50 parts by weight of a halobutyl rubber.

2. The tire innerliner of claim 1 wherein said halobutyl rubber is selected from the group consisting of chlorobutyl rubber, bromobutyl rubber and mixtures thereof.

3. The tire innerliner of claim 1 wherein said blend comprises
   (A) about 40 to about 50 parts by weight of said solution polymerized polymer; and
   (B) about 60 to about 50 parts by weight of a halobutyl rubber.

4. The tire innerliner of claim 1 wherein said solution polymerized polymer has a Tg ranging from −50° C. to −60° C.

5. The tire innerliner of claim 1 wherein
   (1) 27 to 37 weight percent of the repeating units are derived from styrene;
   (2) 10 to 27 weight percent of the repeating units have a 1,2-microstructure; and
   (3) 44 to 55 weight percent of the repeating units have a 1,4-microstructure.

6. The tire innerliner of claim 2 wherein about 60 to about 55 parts by weight of said rubber is bromobutyl rubber.

7. A pneumatic tire having an innerliner prepared from a composition comprising, based on 100 parts by weight of rubber, a blend of
   (A) about 30 to about 50 parts by weight of a solution polymerized polymer having repeating units and a Tg ranging from −45° C. to −65° C., wherein
      (1) 25 to 40 weight percent of the repeating units are derived from styrene;
      (2) 5 to 30 weight percent of the repeating units have a 1,2-microstructure and are derived from butadiene; and
      (3) 40 to 60 weight percent of the repeating units have a 1,4-microstructure and are derived from butadiene; and
   (B) about 70 to about 50 parts by weight of a halobutyl rubber.

8. The pneumatic tire of claim 7, wherein said halobutyl rubber is selected from the group consisting of chlorobutyl rubber, bromobutyl rubber and mixtures thereof.

9. The tire of claim 7 wherein said blend comprises
   (A) about 40 to about 50 parts by weight of said solution polymerized polymer; and
   (B) about 60 to about 50 parts by weight of a halobutyl rubber.

10. The tire of claim 7 wherein said solution polymerized polymer has a Tg ranging from −50° C. to −60° C.

11. The tire of claim 7 wherein
   (1) 27 to 37 weight percent of the repeating units are derived from styrene;
   (2) 10 to 27 weight percent of the repeating units have a 1,2-microstructure; and
   (3) 44 to 55 weight percent of the repeating units have a 1,4-microstructure.

12. The tire of claim 8 wherein about 60 to about 55 parts by weight of said rubber is bromobutyl rubber.

* * * * *